Patented Nov. 29, 1932

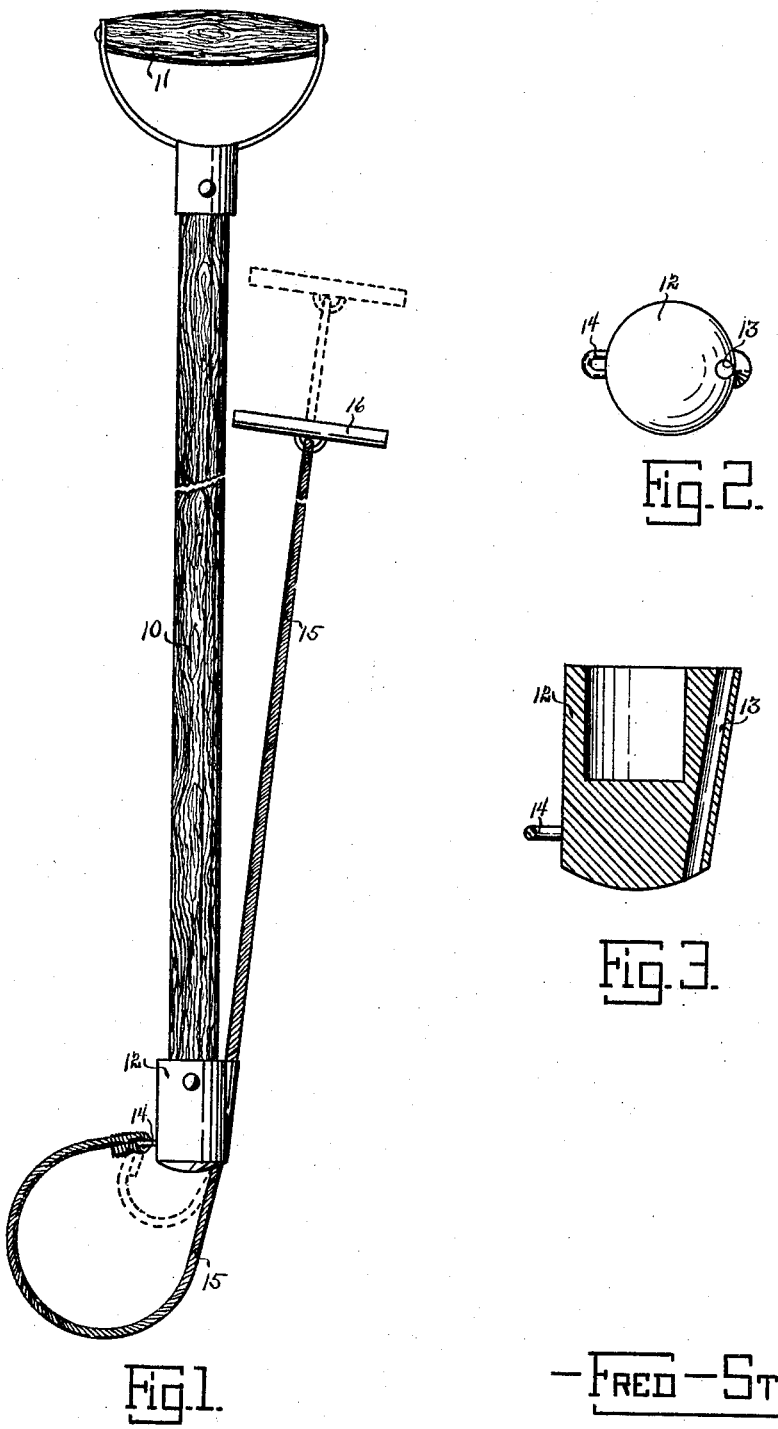

1,889,115

UNITED STATES PATENT OFFICE

FRED STANLEY, OF WEBSTER COUNTY, IOWA

HOG CONTROLLER

Application filed December 10, 1930. Serial No. 501,333.

The principal object of my invention is to provide a device for holding, managing or controlling unruly animals such as hogs.

A further object of my invention is to provide a device that will tame or control either small or large hogs without the necessity of the operator making separate adjustments to conform to the sizes of the animals being controlled.

A still further object of my invention is to provide a hog holder or controller that may be safely and easily operated by one person.

A still further object of my invention is to provide a manually operated device that will hold or control a dangerous hog at a goodly distance from the operator.

A still further object of my invention is to provide a hog controller that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my complete device ready for use.

Fig. 2 is an end view of the forward metallic end member.

Fig. 3 is a side sectional view of the forward metallic end member and more fully illustrates its construction.

There are few domestic animals harder to handle or control than hogs. Even when a hog is not ferocious, it is exceedingly difficult to hold or to guide it when it is desired to move the hog by foot from one location to another. I have overcome such objections as will hereinafter be appreciated.

I have used the numeral 10 to designate an elongated rigid handle or rod. This handle 10 may be of any desirable length. Secured by any suitable means to the rear end of the handle 10 is a hand grip portion 11, to facilitate the manual manipulation of the device. Any other type of hand grip may be substituted instead of the one shown in the drawing, or if desired the hand grip may be completely dispensed with. Secured by any suitable means to the forward end of the handle 10 is the forward metallic member 12. Extending completely through the member 12 is a passageway 13. This straight passageway extends rearwardly and outwardly relative to the handle 10 as shown in the drawing, and its forward entrance is located to one side of the center of the forward end of the member 12.

The numeral 14 designates a loop positioned diametrically opposite from the passageway 13 and formed on the side of the member 12. The numeral 15 designates a metallic cable slidably mounted in the passageway 13 and having its forward end secured to the loop 14. Secured on the rear end of the cable 15 is a handle grip member 16. To operate the device, the handle 10 or grip member 11 is held in one of the hands, and the hand grip 16 in the other hand. By pulling on the hand grip 16, the cable 15 will naturally slide in the passageway 13 and reduce accordingly the diameter of the loop of the cable formed by virtue of its forward end being fastened to the member 14 as shown in Fig. 1. To use my invention a liberal loop is formed at the forward end of the cable. By holding the device as above described, it is an easy matter to place this loop of cable on and around the lower or upper jaw of the hog. In the case of a dangerous hog it will open its mouth in an attempt to bite the end of the device, thereby affording an opportunity to encircle the jaw with the loop of cable. As soon as the cable is encircling the jaw the handle 16 is drawn toward the operator, thereby reducing the loop, as shown with dotted lines in Fig. 1, and tightening the same around the jaw. When a hog is in this condition he is completely under the will of the user of my invention. By the passageway 13 extending rearwardly and slightly outwardly, the cable may be slid therein without undesirable binding action. To release the hog, it is merely necessary to release the rearward pull exerted on the handle 16.

If it is desired the tool may be made of all metal, and in fact may be made of any suitable material.

From the foregoing it will readily be seen that I have provided a desirable hog controlling device and one that may be used on any hog regardless of its size.

Some changes may be made in the construction and arrangement of my improved hog controller without departing from the real spirit and purpose of my invention, and it is my intention to cover by my claims any modified forms of structure or use of mechanical equivalents which may be reasonably included within their scope.

I claim:

1. In a device of the class described, an elongated handle member, a metallic member on the end of said handle member having its forward end rounded, an elongated bore in said metallic member, a cable slidably mounted in said bore, and a means for securing the forward end of said cable to said metallic member.

2. In a device of the class described, an elongated handle member, a metallic member secured on the forward end of said handle member having its forward end rounded, a bore in said metallic member communicating with the rounded end of said metallic member and the rear end of said metallic member, a loop secured to one side of said metallic member, and a cable loosely extending through said bore and having one of its ends secured to said loop.

FRED STANLEY.